US007616886B2

(12) United States Patent  
Matsumura et al.

(10) Patent No.: US 7,616,886 B2  
(45) Date of Patent: Nov. 10, 2009

(54) PHOTOGRAPHING APPARATUS, DEVICE AND METHOD FOR OBTAINING IMAGES TO BE USED FOR CREATING A THREE-DIMENSIONAL MODEL

(75) Inventors: Koichi Matsumura, Bracknell (GB); Adam Michael Baumberg, Guildford (GB); Alexander Ralph Lyons, Cambridge (GB); Kenichi Nagasawa, Kanagawa (JP); Takashi Saito, Yokohama (JP)

(73) Assignee: Canon Europa, NV, Amstelveen (NL)

( * ) Notice: Subject to any disclaimer, the term of this patent is extended or adjusted under 35 U.S.C. 154(b) by 480 days.

(21) Appl. No.: 10/555,317

(22) PCT Filed: May 4, 2004

(86) PCT No.: PCT/GB2004/001896

§ 371 (c)(1),  
(2), (4) Date: Jan. 19, 2007

(87) PCT Pub. No.: WO2004/114681

PCT Pub. Date: Dec. 29, 2004

(65) Prior Publication Data

US 2007/0109295 A1 May 17, 2007

(30) Foreign Application Priority Data

May 7, 2003 (GB) ................................. 0310504.6

(51) Int. Cl.  
*G03B 35/16* (2006.01)

(52) U.S. Cl. .......................... 396/325; 396/326; 348/50; 348/142; 352/70

(58) Field of Classification Search ................. 396/325, 396/329; 348/50, 142; 352/70  
See application file for complete search history.

(56) References Cited

U.S. PATENT DOCUMENTS 4,710,876 A  12/1987  Cline et al. ................. 364/414

(Continued)

FOREIGN PATENT DOCUMENTS

DE    199 13 853    10/2000

(Continued)

*Primary Examiner*—Melissa J Koval  
*Assistant Examiner*—Bret Adams  
(74) *Attorney, Agent, or Firm*—Fitzpatrick, Cella, Harper & Scinto

(57) ABSTRACT

This invention introduces, as one aspect, an apparatus for creating three-dimensional object model, comprising photographing means for photographing an object to be modeled for obtaining images to be used for creating the three-dimensional object model, setting means for longitudinally and latitudinally setting a relative position between the object and said photographing means, said setting means being capable of setting the object and said photographing means a plurality of different relative longitudinal and latitudinal positions, and control means for controlling said photographing means and said setting means so that a number of photographs taken from different relative longitudinal positions at a first relative latitudinal position is larger than that taken from different relative longitudinal positions at a second relative latitudinal position, the first relative latitudinal position being closer to a lateral position than the second relative latitudinal position. Accordingly, it becomes possible to minimize the number of photographs for obtaining necessary images to effectively keep a high quality three-dimensional object model, the number of user's manual operations is reduced, and the total photographing time for creating a three-dimensional object model is significantly decreased.

15 Claims, 9 Drawing Sheets

U.S. PATENT DOCUMENTS

| | | | |
|---|---|---|---|
| 6,317,139 B1 | 11/2001 | Williams | 345/634 |
| 6,952,204 B2 | 10/2005 | Baumberg et al. | 345/420 |
| 6,954,212 B2 | 10/2005 | Lyons et al. | 345/582 |
| 6,970,591 B1 | 11/2005 | Lyons et al. | 382/154 |
| 6,975,326 B2 | 12/2005 | Baumberg et al. | 345/582 |
| 6,975,755 B1 | 12/2005 | Baumberg | 382/154 |
| 7,079,679 B2 | 7/2006 | Kirk et al. | 382/154 |
| 7,092,014 B1 * | 8/2006 | Li et al. | 348/218.1 |
| 2001/0041064 A1 | 11/2001 | Huebner | 396/3 |
| 2002/0159628 A1 | 10/2002 | Matusik et al. | 382/154 |
| 2003/0035061 A1 | 2/2003 | Iwaki et al. | 348/371 |
| 2003/0038801 A1 | 2/2003 | Terauchi et al. | 345/420 |
| 2003/0066949 A1 | 4/2003 | Mueller et al. | 250/208.1 |
| 2003/0160785 A1 | 8/2003 | Baumberg | |
| 2003/0189567 A1 | 10/2003 | Baumberg | |
| 2004/0155877 A1 | 8/2004 | Hong et al. | |
| 2004/0196294 A1 | 10/2004 | Hong et al. | |
| 2005/0151751 A1 | 7/2005 | Hong et al. | |
| 2005/0190179 A1 | 9/2005 | Hong et al. | |
| 2006/0017722 A1 | 1/2006 | Hong et al. | |

FOREIGN PATENT DOCUMENTS

| | | |
|---|---|---|
| EP | 1 193 646 | 4/2002 |
| JP | 5-135155 | 6/1993 |
| JP | 8-233517 | 9/1996 |
| JP | 10-170914 | 6/1998 |
| JP | 2001-82940 | 3/2001 |

\* cited by examiner

FIG.9

| rotation_set | Rotation degrees |
|---|---|
| #0: | 0.0' |
| #1: | 22.5' |
| #2: | 45.0' |
| #3: | 67.5' |
| #4: | 90.0' |
| #5: | 112.5' |
| #6: | 135.0' |
| #7: | 157.5' |
| #8: | 180.0' |
| #9: | 202.5' |
| #10: | 225.0' |
| #11: | 247.5' |
| #12: | 270.0' |
| #13: | 292.5' |
| #14: | 315.0' |
| #15: | 337.5' |

FIG.10

| exp_param_set | AV | TV |
|---|---|---|
| #0: front_texture | F.8.0 | 1/15 |
| #1: backlight | F.8.0 | 1/60 |

FIG.11

| zoom_pos_set | Focal length |
|---|---|
| #0: | Wide-end |
| #1: | ZP1 |
| #2: | ZP2 |
| #3: | ZP3 |
| #4: | ZP4 |
| #5: | Tele-end |

FIG.12

| lighting_ctrl_register | 0 | 1 |
|---|---|---|
| front_light | OFF | ON |
| backlight#0,#1 | OFF | ON |
| backlight#2 | OFF | ON |
| backlight#3 | OFF | ON |
| backlight#4 | OFF | ON |

PHOTOGRAPHING APPARATUS, DEVICE AND METHOD FOR OBTAINING IMAGES TO BE USED FOR CREATING A THREE-DIMENSIONAL MODEL

FIELD OF THE INVENTION

This invention relates to a photographic apparatus, device and method for taking images to be used for creating three-dimensional model. Further, this invention typically relates to those taking images from different longitudinal or latitudinal positions, namely different latitudinal angles.

BACKGROUND OF THE INVENTION

Recently, technologies creating a three-dimensional model of an object from a plurality of images taken from a plurality of positions and/or orientations have been developed. In detail, such technologies generally generate silhouettes from photographed images, create the geometry of the three-dimensional model by using the silhouettes, generate textures from photographed images, and set the generated textures on each polygon of the geometry.

Further, technologies to display such three-dimensional models in an Internet browser and so on and to make necessary rotations so as to make it possible to observe the models have also been developed. Using these technologies, to make three-dimensional models observable through the internet browser, it becomes possible for electronic commerce (E-Commerce) customers to observe merchandise as three-dimensional objects. Thus, it is expected that such three-dimensional object modeling technologies will greatly contribute to the advancement of E-Commerce businesses.

However, it is essential to obtain not only images of the object obtained from longitudinally different angles but also images obtained from vertically (latitudinally) different angles, for example bottom and top images, of the object for creating the three-dimensional model having high quality geometry and high quality texture. Accordingly, it is ordinarily necessary for the user to prepare a studio for photographing the objects to be three-dimensionally modeled and make various arrangements for the photography, for example to repeatedly photograph the object many times. Furthermore, the users have to set lighting conditions and appropriate backgrounds for each of the photographs from various positions and orientations, so as to be able to take textures and silhouettes effectively.

These photographing operations carried out by the users are actually time-consuming. Further, considering operations of longitudinally changing relative positions between a camera and the object to be modeled and operations of setting a camera at a plurality of different latitudinal positions (angles), it necessarily gives users a significantly large workload in order to create three-dimensional object models.

In addition to these, ideal positions for photographing the object are different in dependence on the size of the object. This causes further workload for the user to create two or more three-dimensional object models having different sizes. Namely, the users have to manually change setting of the camera and the object for each object. Accordingly, it has been very difficult to effectively create many three-dimensional object models.

By not only photographing lateral images but also top and bottom images of the object, it would be possible to create a three-dimensional model observable from all orientations. However, to do so, it would be necessary for a user to invert the object, since the bottom of the object sitting on the object-setting surface is invisible. Inverting the object would also cause another adjustment between the image of the bottom and other pre-photographed images to be necessary since focal lengths for photographing the bottom is normally slightly different from ones for photographing other images. A user would have to adjust size of these images by using computer programs increasing workload of the user.

Accordingly, though such technologies are very useful and can contribute industrial progress, users may be restricted as ones who have some photographing skill and users need significant time to photograph the object for creating a three-dimensional object model. In this respect, these technologies have something to be improved.

SUMMARY OF THE INVENTION

This invention has been made to improve a three-dimensional model creating technology.

Objects of this invention are to provide an apparatus and method for photographing the images that are necessary for creating a high quality three-dimensional object model while minimising the number of photographs and to introduce a method for photographing necessary images.

To accomplish the above objects, this invention introduces, as one aspect, an apparatus for creating three-dimensional object model, comprising photographing means for photographing an object to be modeled for obtaining images to be used for creating the three-dimensional object model, setting means for longitudinally and latitudinally setting a relative position between the object and said photographing means, said setting means being capable of setting the object and said photographing means a plurality of different relative longitudinal and latitudinal positions, and control means for controlling said photographing means and said setting means so that a number of photographs taken from different relative longitudinal positions at a first relative latitudinal position is larger than that taken from different relative longitudinal positions at a second relative latitudinal position, the first relative latitudinal position being closer to a lateral position than the second relative latitudinal position.

Further, to accomplish the above objects, this invention introduces, as another aspect, a method for creating three-dimensional object model, comprising steps of photographing an object to be modeled for obtaining images to be used for creating the three-dimensional object model, longitudinally and latitudinally setting a relative position between the object and a photographing position at a plurality of different relative longitudinal and latitudinal positions, and controlling so that a number of photographs photographed from different relative longitudinal positions at a first relative latitudinal position is larger than that photographed from different relative longitudinal positions at a second relative latitudinal position, the first relative latitudinal position being closer to a lateral position than the second relative latitudinal position.

By using the above-mentioned apparatus or the method, it becomes possible to minimize the number of photographs for obtaining necessary images to effectively keep a high quality three-dimensional object model. Accordingly, the number of manual user operations is reduced and the total photographing time for creating a three-dimensional object model is significantly decreased.

This invention also introduces, as one of preferred embodiments, an apparatus which positions the object on a plane as manner putting the object so as to be shown in any direction, sets the object and the photographing means at a third relative latitudinal position where the photographing means locates below the object and controls so that a number of photographs taken from different relative longitudinal positions at the first relative latitudinal position is larger than that taken from different relative longitudinal positions at the third relative latitudinal position.

By introducing such a preferred embodiment, it becomes possible to create a high-quality three-dimensional object model, which is visible from all orientations, with a minimum number of photographs.

Another one of objects of this invention is to introduce an apparatus, which can reduce photographing time for photographing necessary images for creating three-dimensional object model without deteriorating quality of the resultant model.

To accomplish the above objects, this invention introduces, as another aspect of this invention, an apparatus for creating three-dimensional object model, comprising photographing means for photographing an object to be modeled for obtaining images to be used for creating the three-dimensional object model, setting means for longitudinally and latitudinally setting a relative position between the object and said photographing means, said setting means being capable of setting the object and said photographing means at a plurality of different relative longitudinal and latitudinal positions, and control means for controlling said photographing means and said setting means so that said photographing means continuously photographs the object at a first relative latitudinal position and a second relative latitudinal position while said setting means sets the object at one of the relative longitudinal positions.

According to the apparatus above, it becomes possible to reduce time to be photographed for a three-dimensional object model effectively without any deterioration of the resultant three-dimensional object model.

Another one of objects of this invention is to introduce an apparatus, which can reduce a number of photographs for photographing necessary images for creating three-dimensional object model irrespective of a size of the object.

To accomplish the above objects, this invention introduces, as another aspect of this invention, an apparatus for creating three-dimensional object model, comprising photographing means for photographing an object to be modeled for obtaining images to be used for creating the three-dimensional object model, setting means for longitudinally and latitudinally setting a relative position between the object and said photographing means, said setting means being capable of setting the object and said photographing means at a plurality of different relative longitudinal and latitudinal positions, control means for controlling said photographing means and said setting means so that said photographing means photographs the object at a plurality of different relative longitudinal and latitudinal positions, and selection means for selecting at least one of relative latitudinal positions in accordance with a size of the object.

Other features or aspects would be clarified by following detailed embodiments with reference with of drawings.

BRIEF DESCRIPTION OF THE DRAWINGS

There will now be described, by way of example only, embodiments of the invention, with reference to the accompanying drawings, of which:

FIG. 9 shows a table of control data stored in CPU shown in FIG. 5 and used for positioning the circular glass shown in FIG. 1.

FIG. 10 shows a table of imaging parameters stored in storage within the application program.

FIG. 11 shows a table of focal lengths of the digital cameras shown in FIG. 1.

FIG. 12 shows control data used for turning on and turning off the flashlights (backlights) and fluorescent lights (front lights) shown in FIG. 1.

DETAILED DESCRIPTION OF PREFERRED EMBODIMENTS

Figure 1:
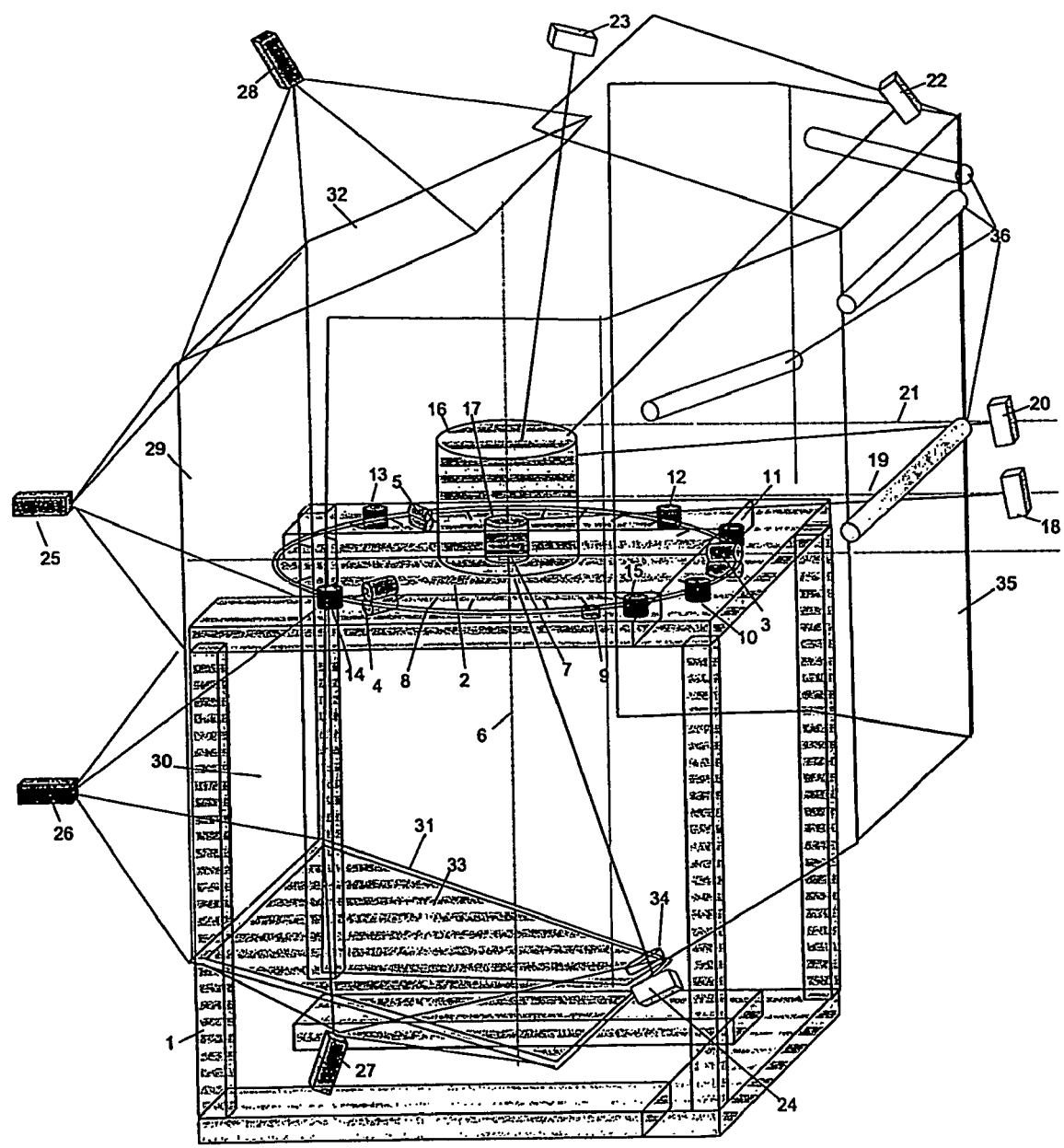
FIG. 1 shows a mechanical structure of a three-dimensional modeling system of one embodiment of the invention.

FIG. 1 shows the mechanical structure of a three-dimensional modeling system of one embodiment of the invention. In the apparatus of FIG. 1, a frame 1 supports the other elements of the system and is composed of a plurality of pole members, with base plates connecting lower ends of the pole members, and upper plates connecting upper ends of the pole members.

A circular glass table 2 is supported on the upper plates of the frame 1. The table is rotated by stepping motors and pinch rollers consisting of rubber. These stepping motors and rollers are numbered 3, 4, and 5. The reference 6 indicates a central axis of rotation of the table 2 and the table rotates around the axis 6. The reference 7 indicates an intersection point of the rotation axis 6 and the table 2. The point 7 is, in this embodiment, for obvious reasons, a central point of the circular table.

Around a circumference of the table 2 are provided rotary encoder marks 8 for being detected so as to provide an angle of rotation of the table 2. The encoder marks 8 are composed of evaporated aluminum thin films respectively extending in the radial directions of the table 2. A photo reflector 9 located at a position confronting the thin films detects them and thus detects the angle of rotation of the table 2.

11, 12, 13, 14 and 15 indicate guide rollers guiding the table 2 so as to rotate around the rotation axis 6. 16 and 17 indicate spaces where three-dimensional objects are set. Space 16 is a space for a bigger object and space 17 is a space for a smaller object.

A digital camera 18 (digital_cam#0), is located on a parallel plane higher than the plane of the table 2 by a predetermined height A. The reference 19 indicates a horizontal line indicating the plane on which the digital camera 18 is located. The digital camera 18 is aimed at the central point 7 and an optical axis of the camera makes an angle of 10 degrees with the plane of the table 2.

Another digital camera 20 (digital_cam#1), is located on a parallel plane higher than the plane of the table 2 by a predetermined height B. The reference 21 indicates a horizontal line indicating the plane on which the digital camera 20 is located. The digital camera 20 is aimed at the central point of the object space 16 and the optical axis of the camera 20 makes an angle of 10 degrees with the plane of the table 2.

Another digital camera 22 (digital_cam#2), is aimed at the central point 7 of the table 2, and the optical axis thereof makes an angle of 45 degrees with the plane of the table 2. Another digital camera 23 (digital_cam#3) is aimed at the central point 7 of the table 2, and the optical axis thereof makes at an angle of 80 degrees with the plane of the table 2. Another digital camera 24 (digital_cam#4) below the plane of the table 2, is aimed at the central point 7 of the table 2, and the optical axis thereof makes an angle of 70 degrees with the plane of the table 2.

A flashlight 25 (flashlight#0,1) for giving backlight is set above the plane of the table 2 opposite the digital cameras 18 and 20. Similarly, another flashlight 26 (flashlight#2) gives backlight. The flashlight 26 is set below the plane of the table 2 opposite the digital camera 22 set at an upward angle of 45 degrees towards an object in spaces 16 or 17. A further flashlight 27 (flashlight#3) for giving backlight is set opposite the digital camera 23 at an upward angle of 80 degrees towards an object in spaces 16 or 17. Another flashlight 28 (flashlight#4) for giving backlight is set opposite the digital camera 24 at a downward angle of 70 degrees towards an object in spaces 16 or 17.

White-light diffuser plates 29, 30, 31 and 32 are located in front of each of the flashlights 25, 26, 27, and 28. For instance, the diffuser plate 29 located at a position illuminated by the flashlight 25 diffuses light received from the flashlight 25. Similarly, the diffuser plate 30 located at a position illuminated by the flashlight 26 diffuses light received from the flashlight 26, the diffuser plate 31 located at a position illuminated by the flashlight 27 diffuses light received from the flashlight 27, and the diffuser plate 32 located at a position illuminated by the flashlight 28 diffuses light received from the flashlight 28.

A polarizing panel 33 having an approximately same size as the diffuser plate 31 is located thereon. Polarizing filter 34 is located in front of the lens of the digital camera 24. The polarizing angle of the polarizing filter 34 is set at a roughly right angle with the polarizing panel 33. A white-light diffuser composed of several plates, is located so as to surround the object 16 or 17. A plurality of fluorescent lights 36 are provided as front light sources and are located behind the light diffuser plates 35 so as to illuminate object spaces 16 and 17 with diffuse light.

Figure 2:
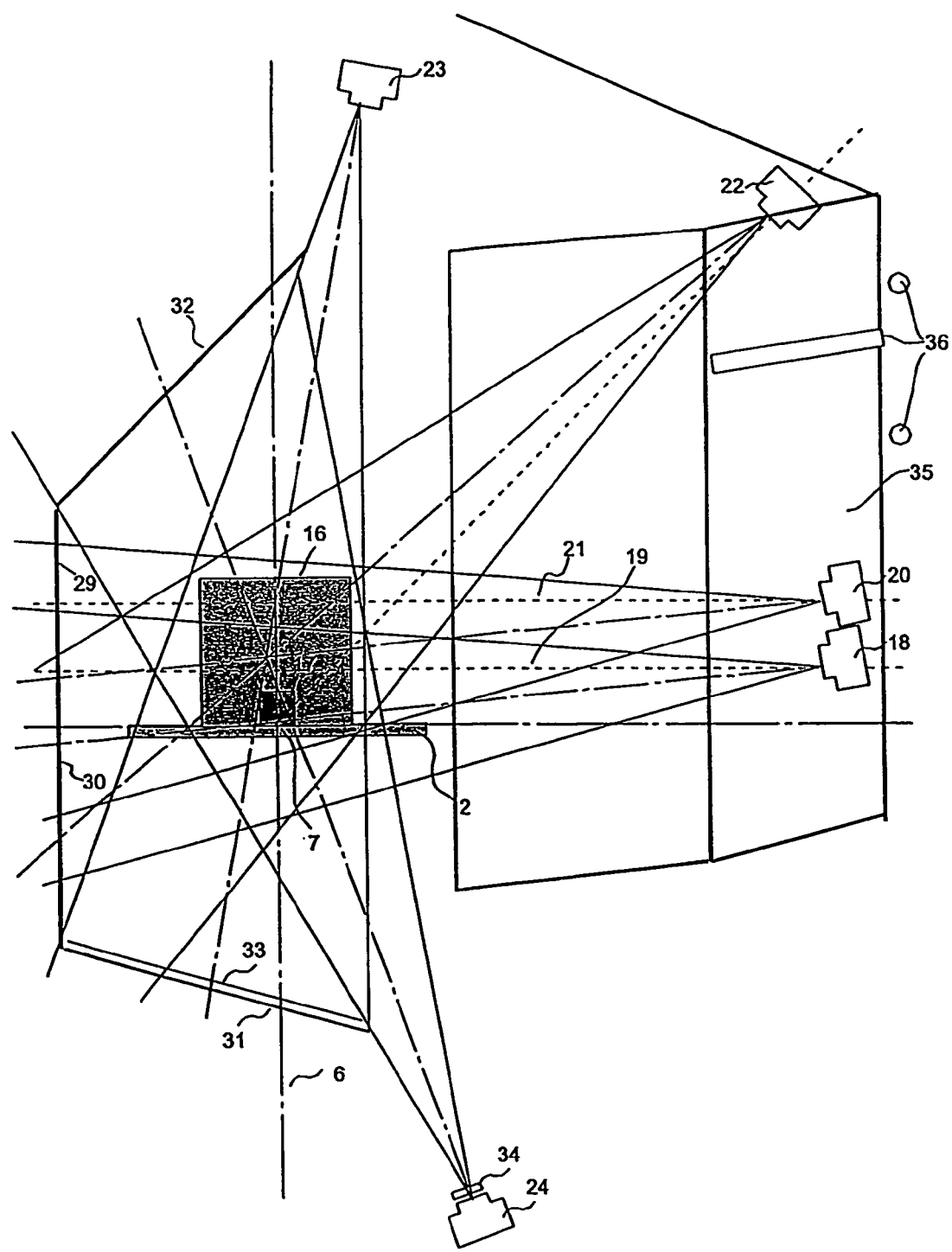
FIG. 2 shows a cross-section of the three-dimensional modeling system according to this embodiment shown in FIG. 1 as a side view.

FIG. 2 shows a cross-section of the three-dimensional modeling system according to this embodiment shown in FIG. 1 as a side view.

Lines extending from each of the digital cameras 18, 20, 22, 23 and 24 represent each of photographing areas thereof in a vertical cross-section. Two solid lines represent an outside border of the photographing area corresponding to a set predetermined focal length, and a central one-dotted-chained line shows a central axis of the photographing area.

Figure 3:
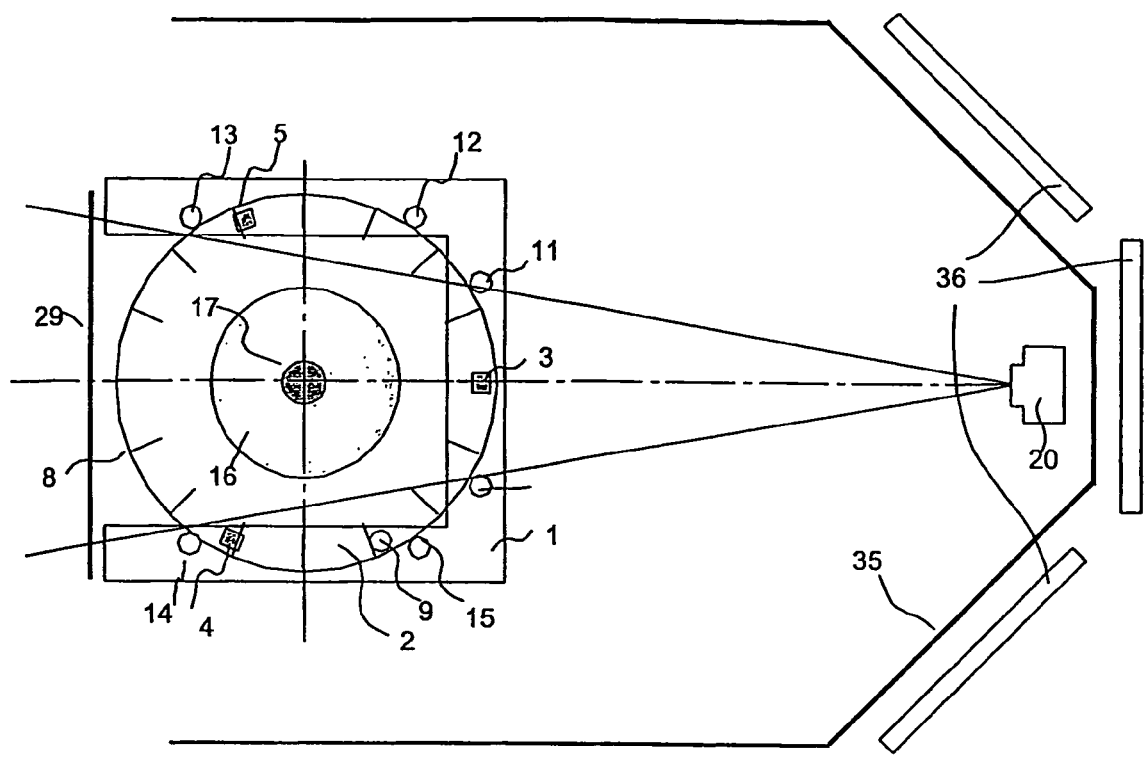
FIG. 3 shows a plan view of the system according to this embodiment shown in FIG. 1 and FIG. 2.

FIG. 3 shows a plan view of the system according to the embodiment shown in FIG. 1 and FIG. 2. Similar to FIG. 2, two solid lines extended from the camera 20 to the table 2 show a photographing area thereof for the predetermined set focal length.

Figure 4:
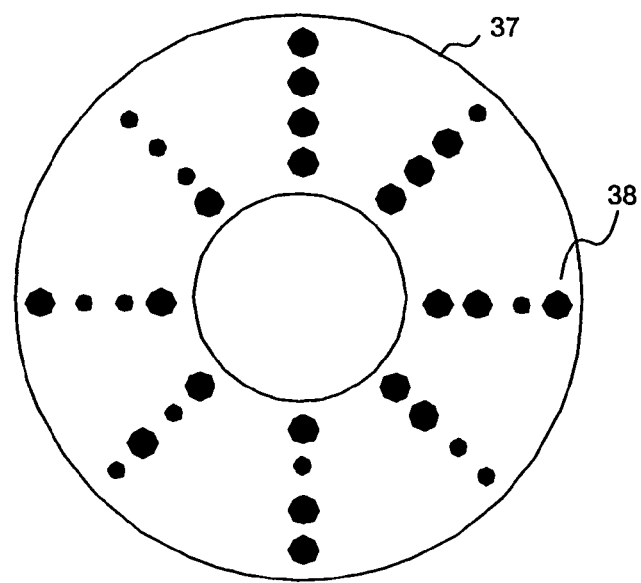
FIG. 4 shows a calibration mat, which is used with the system shown in FIG. 1, FIG. 2 and FIG. 3.

FIG. 4 shows a calibration mat 37, which is used with the system according to this embodiment. Calibration dots 38 are prepared on a calibration mat 37 to enable the detection of the position of each digital camera, the orientation of each digital camera, and the focal length of camera lens of each digital camera. In this embodiment, there are 32 of the calibration dots 38, four (4) dots being located on each of eight (8) different radii dividing the mat into eight (8) equal angles.

These calibration dots may have different sizes, and preferably each set of four dots on a radius has a different pattern of dot sizes compared to the other sets. The calibration mat 37 preferably has the same calibration dots located at the exactly same position on the back as the dots 38 located on the front of the mat. Preferably, of course, the diameter of the calibration mat 37 is smaller than a diameter of the circular glass table 2 and the size of the mat 37 is designed so as not to interfere with any of stepping motors and rollers 3, 4, and 5.

Figure 5:
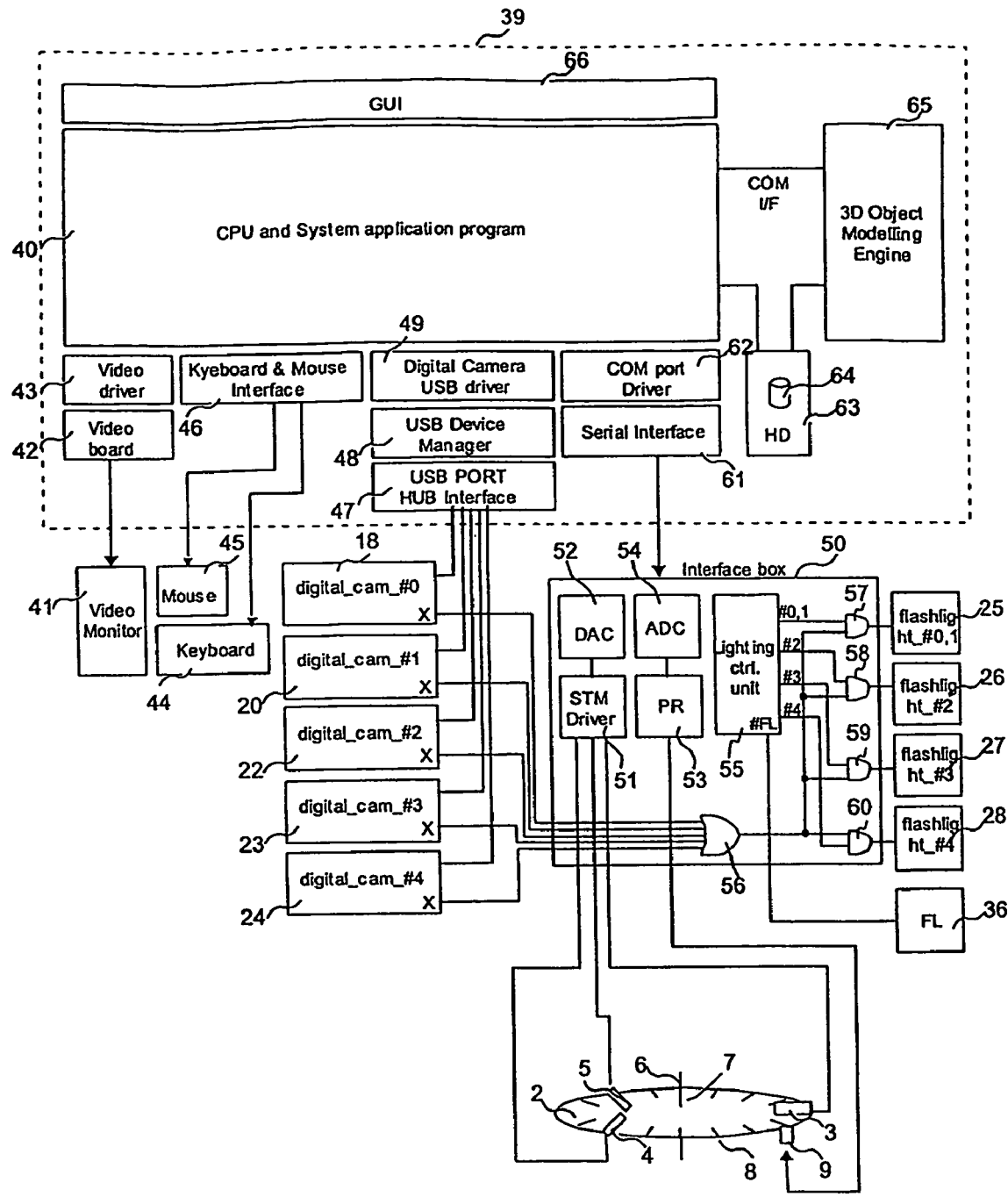
FIG. 5 shows a block diagram representing the electrical system of the three-dimensional modeling system described using FIGS. 1-4.

FIG. 5 shows a block diagram representing the electrical system of the three-dimensional modeling system described using FIGS. 1-4 before as one embodiment of the invention. A doted line shown with the reference 39 represents a part contained in an ordinary personal computer. For example, this personal computer may be composed of ordinary PC platforms conforming to the well-known PC/AT standard.

Central processing unit (CPU) 40 executes an application program. Normally, such an application program is stored in a ROM or a hard disk within the computer 39 as an object code. Then, such a program is read out from the storage and written into a memory within the CPU 40 for execution when the system launched. Since it does not relate to this invention directly, detailed descriptions of data flow, control flow and memory construction within the CPU 40 are omitted in this specification.

A video monitor 41 is connected to the computer 39. A video signal to be displayed at the video monitor 41 is output from a video board 42 to which the monitor 41 is connected. The video board 42 is driven by a set of software programs called a video driver 43. A keyboard 44 is provided by which users of this system manually input data and they may also give instructions using a mouse 45. Such input data and instructions are interpreted in a keyboard and mouse driver 46 composed of a set of software programs.

All of the digital cameras 18, 19, 20, 21 and 22 are connected to the computer 39 by the well-known Universal Serial Bus (USB). The item referenced 47 represents USB ports to which the digital cameras 18, 19, 20, 21 and 22 are physically connected and their HUB interfaces. A USB device manager 48 manages the USB ports and HUB interfaces 47. Also provided are software programs composing a USB driver 49 for controlling the digital cameras 18, 19, 20, 21 and 22.

An interface box 50 controls communications amongst a STM driver 51, a photo reflection detector 53, a lighting control unit 55 and the computer 39. All of elements 51 to 60 are located in the interface box 50 and are described hereafter.

The STM driver 51 drives and controls stepping motors 3, 4, and 5 for rotating the glass circular table 2 in accordance with outputs from a digital to analogue converter (DAC) 52 which converts digital data from the computer into an analogue signal to be used in the STM driver 51. The photo reflection detector (PR) 53 detects an output of the photo reflector 9 indicating positions of the encoder marks 8 composed of evaporated aluminum thin films located a circumference of the table 2. The analogue output of the photo reflection detector 53 is converted to digital data at an analogue to digital converter (ADC) 54.

The lighting control unit 55 has a register that controls flashlights 25, 26, 27 and 28, which are used as backlights for the object on the table. This register is composed of a 5-bit hardware register, the bits of which control flashlights 25, 26, 27 and 28 and fluorescent lights 36 in accordance with control signals provided via a serial interface 61. Such light-control signals are created in accordance with the application program and are communicated via the serial interface 61 under control of a communication serial port driver (COM port Driver) 62.

The control signals for controlling the flashlights are input to two-input AND gates 57, 58, 59 and 60 respectively. A first port, labelled #0, #1 of the register is connected to one input of the AND gate 57. A port #2 of the register is connected to one input of the AND gate 58, a port #3 of the register is connected to one input of the AND gate 59 and a port #4 of the register is connected to one input of the AND gate 60. The register also has a port #FL for front lights and is therefore connected to the plurality of fluorescent lights 36.

A five-input OR gate 56 has its inputs respectively connected to X-triggers of digital cameras 18, 20, 22, 23 and 24. These X-triggers are provided for synchronizing flash with photographing and are well known as "Flash Synchronization" connection points. The other input of each of the AND gates 57, 58, 59 and 60 is connected to the output of the OR gate 56.

A hard disc unit 63 stores data 64 of texture images and silhouette images. A three-dimensional object model creating program is stored in a ROM or a hard disc within the computer 39 as an object code and is represented as stored at 65. The program is read out from the storage and written into a memory within the CPU 40 for execution when the system is launched. The application program and the model creating program (an object modeling engine) communicate through the communication (COM) interface. A program for displaying a graphical user interface (GUI) for the application program stored in CPU 40 is represented as stored at 66.

Figure 6:
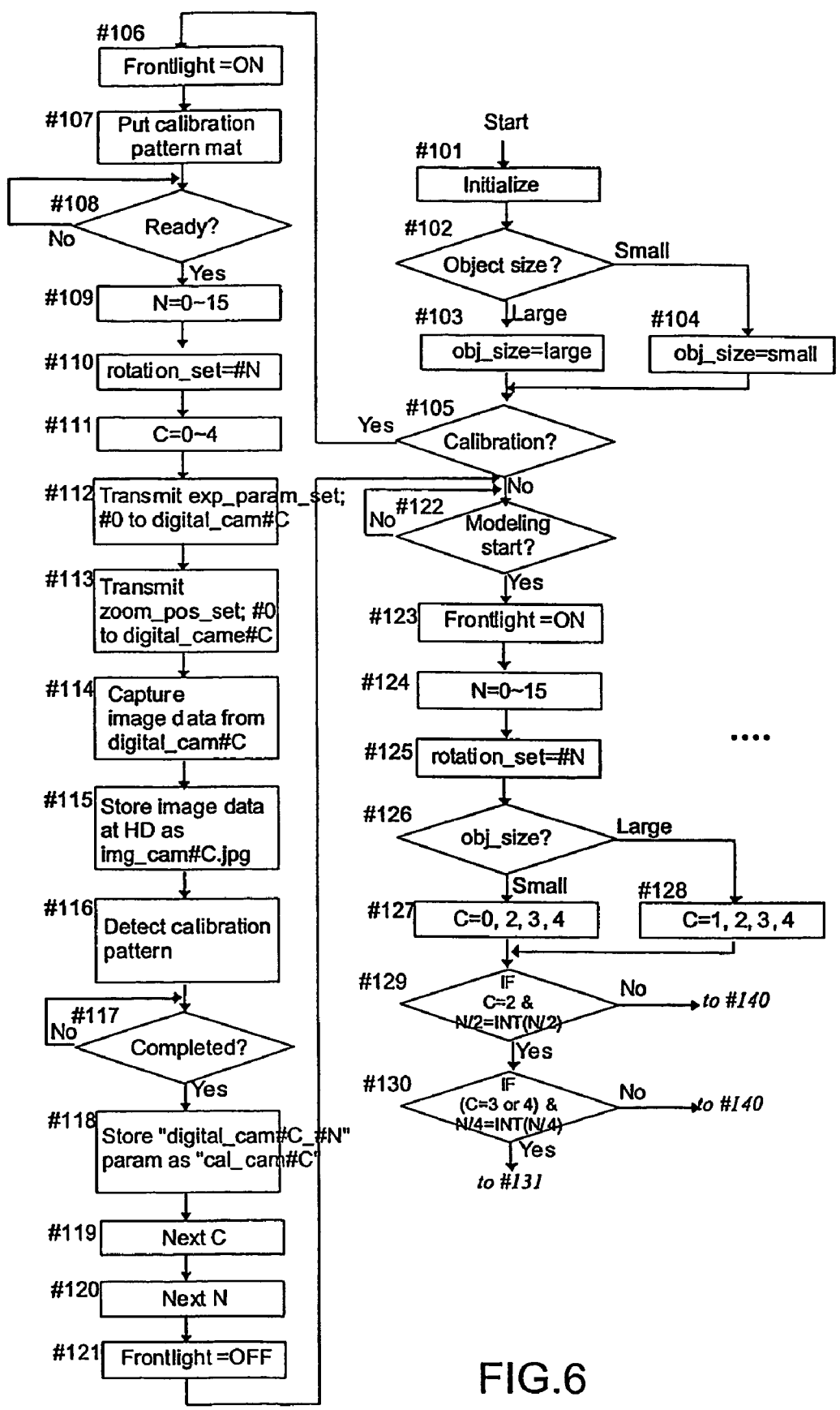
FIG. 6, FIG. 7 and FIG. 8 are flowcharts representing operations of the application program and the three-dimensional object model creating program carried out by the electrical system shown in FIG. 5.
Figure 7:
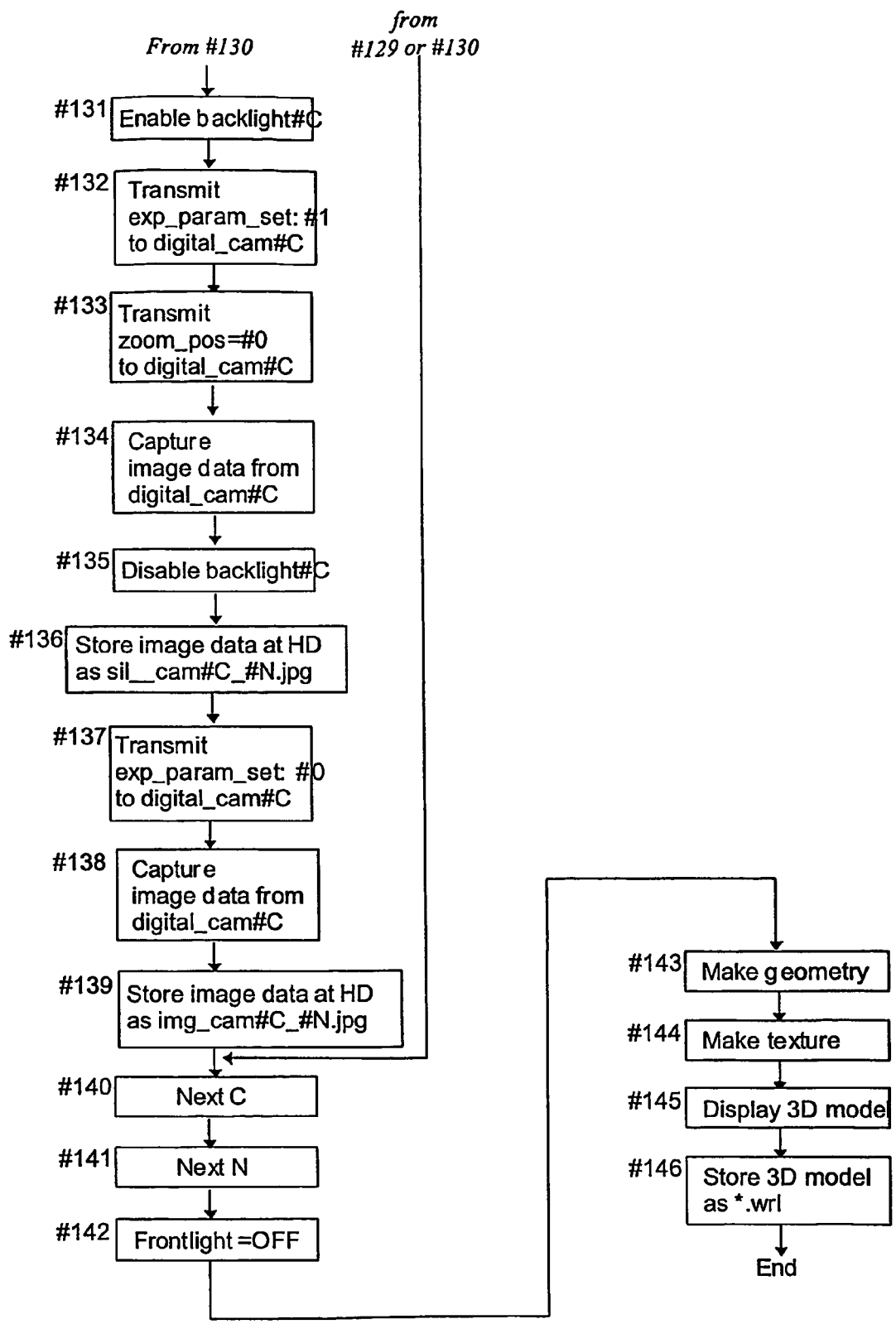
Figure 8:
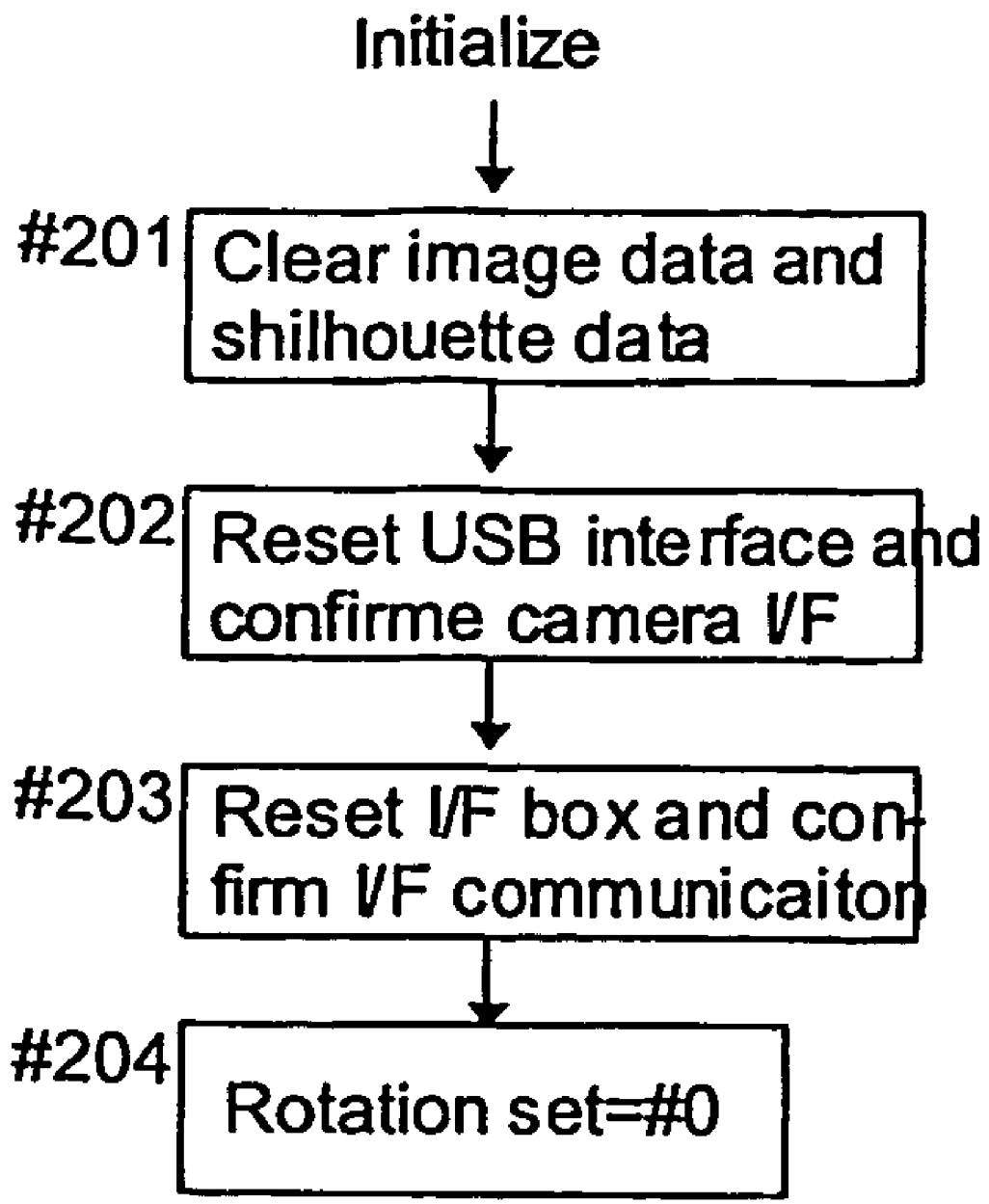

FIG. 6, FIG. 7 and FIG. 8 are flowcharts of operations of the application program in CPU 40 and the three-dimensional object model creating program in storage 65, as carried out by the CPU 40. FIG. 9 shows a table of control data used for positioning the circular glass table 2, which is stored in CPU 40 within the application program. This table shows that the system controls the rotation of the circular table 2 to locate it to each of fifteen (15) rotation positions, each different from a predetermined principal rotation position (#0) by a multiple of 22.5 degrees. Such sixteen (16) positions, including the principal rotation position, are determined by data set (rotation_set: #0-#15) and are designated by the application program.

FIG. 10 shows a table of imaging parameters (exp_param_set) stored in storage within the application program. In accordance with the table shown in FIG. 10, an exposure value (AV) and a shutter speed value (TV) of the digital cameras 18, 20, 22, 23 and 24 are determined corresponding to a designated mode (#0: front_texture, or #1: backlight).

FIG. 11 shows a table of focal lengths of the digital cameras 18, 20, 22, 23 and 24. These parameters representing focal lengths are also stored in the storage 40 within the application program. Such actual focal lengths are determined in response to input data (zoom_pos_set), which represent focal position of zoom lens of the digital cameras.

FIG. 12 shows control data used for turning on and turning off the flashlights 25, 26, 27 and 28 (backlights) and fluorescent lights 36 (front light). These control data are also stored in the storage 40 within the application program.

Operations of the system shown in FIG. 1 to FIG. 5 are described referring to the flowcharts shown in FIG. 6, FIG. 7 and FIG. 8 as follows. As the subject system in one embodiment of this invention starts to operate, the CPU 40 starts the application program and its operations from a step #101 shown in FIG. 6.

In the step #101, all previous settings and data used for previous operations are retrieved and the values are reinitialised. The intialising process is shown in FIG. 8. A step #201 is a starting step of the intialising process. In this step #201, all texture image data and silhouette image data stored in the hard disc unit 63 are cleared. In a following step #202, the CPU 40 resets the USB HUB interfaces 47, the USB device manager 48 and the USB camera driver 49 and confirms communications between the digital cameras 18, 20, 22, 23, 24 and these USB elements 47, 48 and 49.

In a step #203 following the step #202, the CPU 40 initialises the interface box 50, the serial interface 61 and the serial port driver 62 and confirms communication between the interface box to and the interface 61.

Finally in a step #204 of the initializing step #101, the circular glass table 2 is returned to the predetermined principal rotating position in accordance with the application program. In particular, the CPU 40 instructs rotation of the table 2 so as to locate it at the principal rotation position. This instruction is transferred to the interface box 50 through the serial interface 61 and the serial port driver 62. Digital data representing the principal rotating position (#0) is compared with digital data representing the actual rotation position of the table 2 and the CPU 40 calculates digital driving data for the stepping motors 3, 4, and 5.

The digital driving data is converted to an analogue signal at the digital to analogue converter (DAC) 52 and supplied to the STM driver 51. The STM driver 51 drives stepping motors 3, 4, 5 in accordance with the analogue signal. The photo reflection detector (PR) 53 determines the actual rotation position of the table 2 by detecting an output of the photo reflector 9 reflecting the positions of the encoder marks 8.

The CPU 40 refers the table shown in FIG. 9 to determine a targeted rotation position (angle) of the table 2 and calculates difference between the current actual rotating position of the table 2 and the targeted position. In accordance with the difference, the CPU 40 generates digital driving data necessary to drive the stepping motors 3, 4, and 5. Accordingly, the stepping motors 3, 4, and 5 are driven by the analogue driving signal output from the DAC 52 so that the table 2 can be located at the predetermined principal position.

After the above initialising process, operations are returned to a step #102 shown in the FIG. 6. In this step #102, a user of this system decides a size of a three-dimensional object to be photographed and modeled. In accordance with the application program and the program for displaying a graphical user interface (GUI) 66, the CPU 40 displays a size-selecting window on the display of the video monitor 41 via the video board. The user utilises the keyboard 44 or the mouse 45 to select the size of the object by referring the displayed page. Since the GUI and the selecting page itself are not important to describe this invention, detailed descriptions thereof are omitted.

In this embodiment, the user can select the size of the object as "Small" or "Large". In accordance with this embodiment, it is preferable to select "Small" if the height of the object is smaller than the predetermined height A which corresponds to the horizontal line 19 indicating the plane on which the digital camera 18 is located. On the other hand, if the height of the object is larger than the height A but smaller than the height B which corresponds to the horizontal line 21 representing the plane on which the digital camera 20 is located, it is preferable for the user to select "Large".

If the user selects the object size as "Large", this result is registered as "obj_size=large" in a step #103. If the user selects the object size as "Small", this is registered as "obj_size=small" in a step #104.

Following these steps #103 and #104, the user can select whether calibration is to be carried out or not. Similar to the step #102, the CPU 40 displays a calibration-selecting page via the GUI on the display of the video monitor 41 in accordance with the application program. If the user selects to carry out the calibration, the process goes to a step #106. If the user selects not to carry out the calibration, the process skips steps #106 to #121 and goes to a step #122.

The steps #106 to #121 for calibration are now described as follows. In the step #106, the fluorescent lights 36, the front lights, are turned on. In detail, in accordance with the application program, the CPU 40 instructs the writing of a flag "1" in the front light control bit of the register in the lighting control unit 55 of the interface box 50 though the serial interface 61 under control of the COM port Driver 62. Accordingly an output of the port of front lights #FL switches to a predetermined level representing "1" and, as shown in the table of FIG. 12, the fluorescent lights 36 are turned on.

In a step #107, the CPU 40 displays a window urging the user to put the calibration mat 37 on the circular glass table 2 via the GUI on the display of the video monitor 41 in accordance with the application program. Further, in a step #108, the CPU 40 displays a window for the user to confirm whether the calibration mat 37 has already been put on the table 2 or not. If the user confirms this, namely ready to calibrate, the process goes to a step #109.

In a step #109, a loop variable N is set as one of sixteen integers from "0" to "15". Initially the variable N is set as "0".

In a step #110, the CPU 40 determines a targeted rotating position (angle) of the table 2 by outputting one of the data sets (rotation_set: #0-#15). The CPU 40 refers the table shown in FIG. 9. Operations of the CPU 40, the stepping motors 3, 4, and 5, photo reflection detector (PR) 53, and the DAC 52 to rotate the table 2 to the targeted position are similar to the operations described before for the step #101 (#204).

In the step #111, a variable, a software repeat counter C, is set as "0", "1", "2", "3", or "4". Initially the variable C is set as "0".

In a following step #112, the imaging parameters shown in the table of the FIG. 10 are set (in accordance with exp_param_set: #0) for front light, namely the exposure value (AV) is set to F8.0 and the shutter speed (TV) is set 1/15 second. These parameters are transferred to one of the digital cameras 18, 20, 22, 23 and 24. These parameters are transferred through the USB ports HUB interfaces 47 under control of the USB device manager 48 and the USB camera driver 49 to the digital camera (digital_cam_#C). Therefore, in this initial stage, the parameters are transferred to the digital camera 18 (digital_cam_#0).

In a step #113, a parameter representing a focal length is also transferred to the digital camera (digital_cam_#C) through the USB ports HUB interfaces 47. In this step #113, the transferred parameter is a set #0 (zoom_pos_set: #0), which represents a wide-end focal length in accordance with the table of the FIG. 11. Similarly, in this initial stage, this parameter is also transferred to the digital camera 18 (digital_cam_#0).

In a step #114, the CPU 40 sends a command to photograph to the digital camera (digital_cam_#C) and the digital camera takes an image. Image data obtained by the digital camera (digital_cam_#C) is transferred to the hard disc unit 63 through the USB ports HUB interfaces 47 after compressing the image data in conformity with well-known JEPG compression scheme in a step #115. The name of such image file is, for example, "img_cam #0. jpg".

The JEPG compressed image data obtained in the step #114 and stored in the step #115 is processed and developed and the CPU 40 detects the calibration dots 38 on a calibration mat 37 in the captured image in accordance with the application program and three-dimensional object model creating program 65 in a step #116. The CPU 40 processes and analyses the detected calibration dots and determines a central position of the calibration mat 37 for creating supposed three-dimensional coordinates. In accordance with the supposed three-dimensional coordinates, a position and an orientation of the digital camera, and a focal length of the digital camera, the focal length of the camera can be obtained from the image of the calibration dots 38 by using perspective information. Detailed methods or processes for obtaining the central position of the calibration mat 37, the supposed three-dimensional coordinates, the position and the orientation of the digital camera, and the focal length were disclosed in several former patent applications, for example, a Japanese Raid-Open Patents numbered 00-96374, a Japanese Raid-Open Patents numbered 98-170914 and a UK patent application numbered 0012812.4, and these methods or processes can be adopted for this step #116. Therefore, in this specification, detailed descriptions of such concrete methods and processes.

In the step #116, if the digital camera 24 (digital_cam_#4) located beneath the table is designated by the variable C, the image of the calibration dots is obtained from the back of the calibration mat 37 and is processed and analysed for obtaining the position and the orientation of the digital camera 24, and the focal length of the digital camera 24.

After the step #116 and confirming the completion of obtaining information for the digital camera (digital_cam_#C) in a step #117, the obtained camera information, including the position, the orientation and the focal length of the digital camera (digital_cam_#C_#N) are stored in the hard disc unit 63 as a file named "cal_cam#C" in a step #118.

In a step #119, the variable C designating the digital camera is incremented. In the initial stage, the variable C is changed from "0" to "1". As easily understood, the steps #111 to #119 are repeated for each value of the variable C from "0" to "4".

In the step #120, the variable N is incremented and the process goes back to the step #109 from the step #120. (Lines returning from steps #119 to #111 and #120 to #100 are not shown in the FIG. 7 and FIG. 8.) As described before, in step #110, the CPU 40 determines the targeted rotating position (angle) of the table 2, the table 2 is rotated to the targeted position.

The variable N is incremented one by one and finally comes to "15". At that point all of the photographic processes have been completed, the circular glass table has been completely rotated around the object and all camera calibration parameters with each camera position at every rotation angle have been stored by step #118.

Namely, each of the digital cameras 18 (digital_cam#0), 20 (digital_cam#1), 22 (digital_cam#2), 23 (digital_cam#3), and 24 (digital_cam#4) have been selected in turn and each digital camera has photographed the image of the calibration dots 38 in order to obtain the camera information (the position, the orientation and the focal length) for each of the digital cameras. These information have been stored in the hard disc unit 63 as files "cal_cam#0", "cal_cam#1", "cal_cam#2", "cal_cam#3", and "cal_cam#4".

After these repeated processes in the steps #109 to #120, a value of the variable N is checked in a step #120 to confirm whether the repeated processes in the steps #109 to #120 are completed for all of the digital cameras 18, 20, 22, 23, and 24 or not. If it is confirmed, the process goes to a next step #121. In the step #121, the CPU 40 instructs to write a flag "0" in the front light control bit of the register in the lighting control unit 55. Accordingly an output of the port of front lights #FL switches to another predetermined level representing "0" and the fluorescent lights 36 are turned off in accordance with the table of the FIG. 12.

All processes for calibration are completed at the step #121 and the process returns to a step #122. In a step #122, the CPU 40 displays a window for asking the user if an actual modeling process shall be started, using the GUI, on the display of the video monitor 41. If the user instructs by using keyboard 44 or the mouse 45 to start an actual modeling, the process goes to a step #123.

In the step #123, the CPU 40 turns on the fluorescent lights 36, i.e. the front lights. This process is the same as the step #106. This time, the variable N is set as one of sixteen integers from "0" to "15". Initially the variable N is set as "0" in a step #124.

In a step #125, the CPU 40 determines a targeted rotation position (angle) of the table 2 by outputting one of the data sets (rotation_set: #0~#15). The CPU 40 refers to the table shown in FIG. 9. Operations of the CPU 40, the stepping motors 3, 4, and 5, photo reflection detector (PR) 53, and the DAC 52 to rotate the table 2 to the targeted position are similar to the operations described before for the step #101. In a step #126, the CPU 40 consults the selection result of the object size ("Small" or "Large") made by the user by reading out registered information as "obj_size=large" or "obj_size=small".

At step #126, if the user selected the object size as "Small", the process goes to a step #127. If the user selected the object size as "Large", the process goes to a step #128. In the step #127, numbers to be selectively used as another variable C are set as 0, 2, 3, and 4. On the other hand, in the step #128, numbers to be selectively used as another variable C are set as 1, 2, 3, and 4. This means, the digital camera 18 (digital_cam_#0) is used if the object size is small, but the digital camera 19 (digital_cam_#1) is used if the object size is large. Other digital cameras 20.22, and 24 are commonly used irrespective of the size of the object. In an initial stage, this variable C is set either "0" or "1 in accordance with the size of the object.

Two steps #129 and #130 both check the variable C and the variable N. If the variable C is "2" and the variable N is not a multiple of two, the process directly goes from the step #129 to the step #140, skipping steps #131 to #139. If the variable C is "3" or "4" and the variable N is not a multiple of four, the process directly goes from the step #130 also to the step #140, skipping steps #131 to #139. Otherwise, the process goes to a step #129.

This means, if the camera 18 (digital_cam_#0) or 19 (digital_cam_#1) is selected, the steps #131 to #139 (executing the photographing of an object) are always carried out the photographing process irrespective of a photographing angle, namely the rotation position of the table 2. Accordingly, each of sixteen (16) images is taken by the camera (digital_cam_#0) 18 or the camera (digital_cam_#1) 20.

On the other hand, if the camera 20 (digital_cam_#2) is selected, the steps #131 to #139 (executing the photographing) are carried out only when the table 2 is at the principal rotation position or rotation positions different from the principal rotation position (#0) by each of multiple angles of 45 degrees. Accordingly, eight (8) images are taken by the camera 20 (digital_cam_#2). Similarly, if the camera 22 (digital_cam_#3) or the camera 24 (digital_cam_#4) is selected, the steps #131 to #139 (executing the photographing) are carried out only when the table 2 is at the principal rotation position or rotation positions different from the principal rotating position (#0) by each of multiple angles of 90 degrees. Accordingly, only four (4) images are taken by both the camera 22 (digital_cam_#3) and the camera 24 (digital_cam_#4).

The photographing process carried out in the steps #131 to #139 is described hereafter. In the step #131, the CPU 40 instructs to write a flag "1" in one of the backlight control bits of the register in the lighting control unit 55 of the interface box 50 though the serial interface 61 under control of the COM port Driver 62. For example, for port #0,#1 the corresponding bit of the register is switched to "1", which switches the output of port #0,#1 to a level representing "1". Thus (in accordance with the table of FIG. 12) the backlights may be turned on.

In the following step #132, the imaging parameters, shown in the table of the FIG. 10, are set (in accordance with exp_param_set: #1) for backlight, namely the exposure value (AV) is set to F8.0 and the shutter speed (TV) is set to 1/60 second. Then, these parameters are transferred to one of the digital cameras 18, 20, 22, 23 and 24. These parameters are transferred through the USB ports HUB interfaces 47 under control of the USB device manager 48 and the USB camera driver 49 to the digital camera (digital_cam_#C). Therefore, in this initial stage, the parameters are transferred to the digital camera 18 (digital_cam_#0) or the digital camera 19 (digital_cam_#1).

In a step #133, a parameter representing a focal length (zoom_pos_set: #X), is also transferred to the digital camera (digital_cam_#C) through the USB ports HUB interfaces 47. The focal length "#X" is manually selected by the user among six focal lengths ("#0" to "#5") shown in the table of the FIG. 11 before the photographing process. The user needs to select the focal length so that the whole of the object is in a photographic area of each digital camera.

Of course, this user's selection may be given by using the GUI. For example, the CPU 40 displays a focal length selecting page showing six focal lengths to be selected, using the GUI, on the display of the video monitor 41 via the video board 42. The user utilises the keyboard 44 or the mouse 45 to select one of the focal lengths by referring the displayed page.

In a step #134, the CPU 40 sends a command to photograph to the digital camera (digital_cam_#C) and the digital camera takes an image. In response to this command to photograph, one of the X-triggers of digital cameras 18, 20, 22, 23 and 24 is closed and becomes a predetermined level representing "1" for a predetermined period of time. Thus, the output of the OR gate 56 becomes a predetermined level representing "1" and one of the AND gates 56, 58, 59 and 60 corresponding to the digital camera (digital_cam_#C) outputs a predetermined level representing "1". Accordingly, one of the flashlights 25, 26, 27, and 28 is turned on and emits flashlight in synchronization with the X-trigger, namely a photographing operation of the digital camera (digital_cam_#C). For example, in the initial stage of this photographing process while the variable C is 0 or 1, the digital camera 18 (digital_cam_#0) or the digital camera 20 (digital_cam_#1) photographs the object and the flashlight 25 emits flashlight.

In a step #135, the CPU 40 instructs to write a flag "0" in one of the backlight control bits of the register in the lighting control unit 55. For example, for port #0,#1 the corresponding bit of the register is switched to "0", which switches the output of port #0,#1 to a level representing "0". Thus the backlight #0,#1 is disabled.

The image data obtained by the digital camera (digital_cam_#C) in the step #134 is transferred to the hard disc unit 63 after compressing in conformity with well-known JEPG compression scheme in a step #136. The name of such image file is "sil_cam#C_#N. jpg". For instance, if the digital camera 18 (digital_cam_#0) is used in the initial stage and the photographing is made while the table 2 locates at the principal rotation position, the name of the image file is "sil_ cam#0_#0. jpg". As seen, the name of the file includes "sil" indicating a silhouette image, "#C" indicating the camera used for photographing, and "#N" indicating the rotation position of the table 2.

In a step #137, the imaging parameters shown the FIG. 10 are set (in accordance with exp_param_set: #0) for front light. Accordingly the exposure value (AV) is set as F8.0 and the shutter speed (TV) is set as 1/15 second. Similarly to the step #132, these parameters are transferred to the digital cameras (digital_cam_#C). In the initial stage, the parameters are transferred to the digital camera 18 (digital_cam_#0) or the digital camera 19 (digital_cam_#1).

The digital camera typically uses the same focal length (zoom_pos_set: #X) for both obtaining the silhouette image and the texture image. Therefore, the same focal length (zoom_pos_set: #X) is used also in the capturing step #133. It shall be noted that the fluorescent lights 36, the front lights, have been continuously turned on since the step #123.

In a step #138, the CPU 40 sends a command to photograph to the digital camera (digital_cam_#C) and the digital camera takes a texture image. In this moment, since none of the X-triggers of digital cameras 18, 20, 22, 23 and 24 is closed and each has a predetermined level representing "0", none of the flashlights 25, 26, 27, and 28 is turned on and emits any lights.

The image data obtained by the digital camera (digital_cam_#C) is, in the step #138, transferred to the hard disc unit 63 after compression in conformity with the well-known JEPG compression scheme in a step #139. The name of such image file is, for example, "ima_cam#C_#N.jpg". For instance, if the digital camera 18 (digital_cam_#0) is used in the initial stage and the photographing is made while the table 2 located at the principal rotating position, the name of the image file is "ima_cam#0_#0 .jpg". As seen, the name of the file includes "ima" indicating a texture image, "#C" indicating the camera used for photographing, and "#N" indicating the rotating position of the table 2.

After all of the steps #131 to #139 executing photographing are completed, the variable C is incremented in a step #140. If it was judged that the object is small, the process goes back to the step #127 from the step #139, (the line for that not being shown in FIG. 7 and FIG. 8). For instance, if the variable C was set as "0" so that the digital camera 18 (digital_cam_#0) is used during the first photographing process, the variable C becomes "2" in the step 127. On the other hand, if it was judged that the object is large, the process goes back to the step #128 from the step #140. For instance, if the variable C was set as "1" so that the digital camera 20 (digital_cam_#1) is used during the first photographing, the variable C becomes "2" in the step 128. Thus, whichever the object is small or large, the photographing process using the digital camera 22 (digital_cam_#2) is next executed in the steps #131 to #139.

After photographing process using the digital camera 22 (digital_cam_#2) is completed, the variable becomes "3" and the digital camera 23 (digital_cam_#3) is selected to be used in the photographing process. Finally, the variable C comes "4" and the digital camera 24 (digital_cam_#4) is selected to be used in the photographing process.

Before step #141, all of these photographing processes are executed whilst the table 2 is located at the principal rotation position. In the step #141, the variable N is incremented and the process goes back to the step #124 from the step #140, (the line for that not being shown in FIG. 7 and FIG. 8). As described before, in the step #125, the CPU 40 determines the targeted rotation position (angle) of the table 2, the table 2 is rotated to the targeted position.

The variable N is incremented by units of one and finally becomes "15". At that point all of the photographic processes have been completed, the circular glass table has been completely rotated around the object and all texture images and silhouette images from all angles have been stored in the hard disc unit 63. The final total number of the texture images is 32 (=16+8+4+4) and the final total number of the silhouette images also is 32 (=16+8+4+4).

After all photographing process repeatedly executed in the steps #124 to #139 have completed, the process goes to a step #142. In the step #142, the CPU 40 instructs to write a flag "0" in the front light control bit of the register in the lighting control unit 55. Accordingly an output of the port of front lights #FL turns to the predetermined level representing "0" and the fluorescent lights 36 are turned off in accordance with the table of the FIG. 12.

In a step #143, executing the three-dimensional object model creating program 65, the CPU 40 creates three-dimensional geometry data of the object by using all silhouette images stored in the hard disc unit 63. The three-dimensional geometry is defined by polygons, including triangles and four-cornered polygons. Detailed methods or processes for obtaining the three-dimensional geometry data by using silhouette images taken from different positions and orientations is disclosed in former patent applications, for example, U.S. Pat. No. 6,317,139, U.S. Pat. No. 4,710,876, and a UK application number 0114157.1 (CRE235), and these methods or processes can be adopted to this step #143. Therefore, in this specification, detailed descriptions of such methods and processes are omitted.

In the step #143, before creating three-dimensional geometry, parameters including photographing positions, orientations, and focal lengths for each of digital cameras and each photographing are calibrated by using the obtained camera information, including the position, the orientation and the focal length of the digital cameras stored in the hard disc unit 63 as files named "cal_cam#C" in the step #118.

In a step #144, in accordance with the three-dimensional object model creating program 65, the CPU 40 creates three-dimensional texture data to be put on surfaces of each polygons created in the step #143 by using all texture images stored in the hard disc unit 63. Detailed methods or processes for obtaining the three-dimensional texture data for each polygon by using two-dimensional texture images taken from different positions and orientations is disclosed in former patent applications, for example, UK application number 0022343.4 (CRE223), and such methods or processes can be adopted to this step #144. Therefore, in this specification, detailed descriptions of such concrete methods and processes are omitted. Thus, all information of three-dimensional object including geometry and texture are finally obtained.

In a step #145, the resultant three-dimensional object having geometry on which texture images have been put is displayed on the display of the video monitor 41. As known, such resultant three-dimensional model can be rotated, magnified or like by the user, using the keyboard 44 or the mouse 45.

In a step #146, all information of such a resultant three-dimensional object including three-dimensional geometry information and three-dimensional texture information to be put on the geometry is stored in the hard disc unit 63 as an ordinal VRML file (*.wrl), for example. The process is completed after the step #146.

When the digital camera 24 located beneath the glass table 2 photographs the object, normally the digital camera 24 picks up the light reflected by the glass table 2. This reflected light obviously deteriorates quality of the resultant three-dimensional object. Especially, the existence of the white-light diffuser plate 31 causes a significant problem, namely that directly reflected light from the plate 31 illuminates a lower surface on the glass table within a photographing area of the digital camera 24. This reflected light illuminating the lower surface in the main deteriorates the contrast of texture images of a bottom of the object.

To solve this, in this embodiment, the polarizing panel 33, which has almost the same size as the white-light diffuser plate 31, was put thereon and the polarizing filter 34 was set in front of a camera lens of the digital camera 24, which has a photographing area illuminated by the directly reflected light from the white-light diffuser plate 31. Further the polarizing angle of the polarizing filter 34 is set at roughly a right angle with the polarizing panel 33. Accordingly the system of this embodiment can significantly reduce the inappropriate influence caused by the directly reflected light from the white-light diffuser plate 31 on the resultant three-dimensional object model.

In accordance with the embodiment described above, finally all information of such a resultant three-dimensional object is finally stored as the VRML file. However, it is possible to store by using other types of files.

In accordance with the embodiment described above, the fluorescent lights 36 are used as front lights. However, other types of lights such as tungsten lights can be used. The white balance of the digital cameras has preferably, however, to be set so that colour temperature of the produced image is appropriate.

Further, other types of lights, such as tungsten lights or fluorescent lights, can be used as backlights instead of the flashlights.

To make description more brief and concise, the embodiment described above only introduced two kind of image parameters, as shown in FIG. 10, for texture images using only front lights and silhouette images using a backlight. However, such parameters like an exposure value (AV) and a shutter speed (TV) are preferably set more precisely in consideration with luminance value of each of the emitted lights, to effectively obtain high-quality texture images and silhouette images. It shall be noted that one aspect of this embodiment and one advantage of this embodiment is to select the different exposure parameters between texture images and silhouette images. This provides significant improvement in obtaining high-quality texture and silhouette images.

The location of cameras and focal lengths of each of camera lens are considered and are decided in accordance with several factors, including the size of the object, distance between the object and backlight, and the size of the backlight, so that the outline of the object is surrounded by the backlight.

In accordance with the embodiment described above, a plurality of digital cameras are prepared for each vertical (latitudinal) location. However, it would also be possible to move one digital camera so as to locate it at a plurality of latitudinal locations by using a moving mechanism. If the moving mechanism accurately locates the digital camera at each latitudinal location, such a system may give a cheaper solution than this embodiment. This aspect of this embodiment is therefore not in how many cameras are used but rather the existence of a plurality of latitudinal locations where the camera photographs the object. Therefore, it shall be understood that obtaining a plurality of latitudinal locations for photographing by moving the digital camera is within the scope of this invention.

Figure 13:
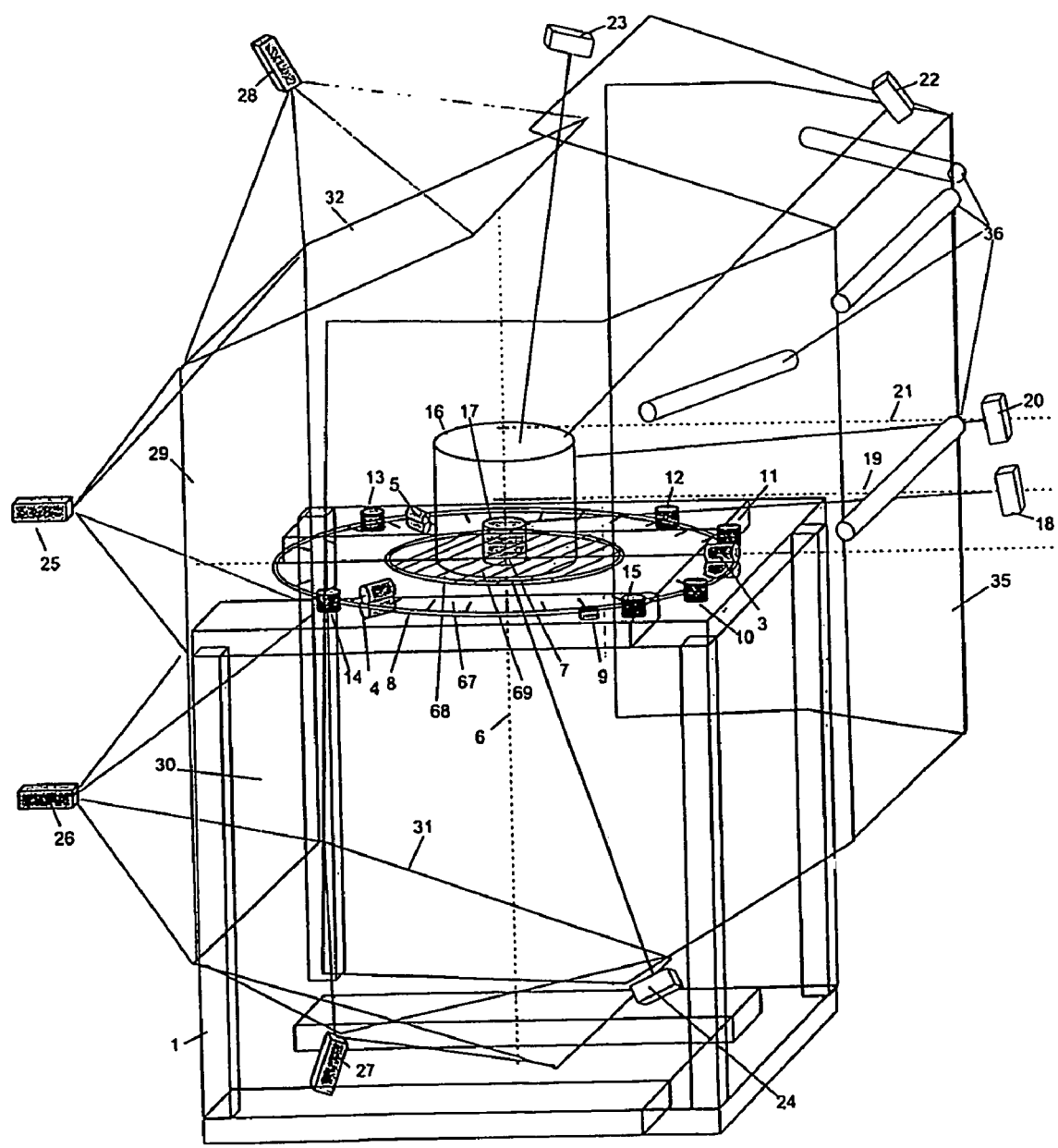
FIG. 13 shows another embodiment of the system according to this invention.

FIG. 13 shows another embodiment of the system according to this invention. This embodiment introduces fine nylon fibers roped off on a plane on which the object is put instead of the glass table. In FIG. 13, the reference 67 shows a rotating table made of metal such as aluminum. The table 67 has a hole where fine nylon fibers 69 are secured.

The material of the nylon fibers is selected so that fibers can be made sufficiently fine enough to be unnoticeable or invisible from the digital cameras. The number of fibers is decided in accordance with size and weight of the object. The size of the hole is decided so as to cause no obstacle to the creation of silhouette images taken by all digital cameras.

By this embodiment shown in FIG. 13, it becomes possible to float the object in air substantially without visible materials. In comparison with the former embodiment, this embodiment shown in FIG. 13 has an advantage in avoiding the inappropriate influence of the reflected lights without using other elements like a polarizing panel, a polarizing filter 34 and so on.

These embodiments described above have many advantages in comparison with the prior technology for creating three-dimensional object model, as follows.

First of all, the above-described embodiments make it possible to minimize the number of photographs while keeping the quality of resultant three-dimensional object model, by decreasing a number of photographs from latitudinal relative positions further from the lateral position. This greatly contributes to a reduction in the total number of photographs and total time for photographing.

Further, in accordance with the above-described embodiments, since a plurality of photographs at the same longitudinal photographing position are continuously conducted from one or more different latitudinal photographing positions, the time needed for changing relative latitudinal and longitudinal positions between the object and the camera is minimized. Especially, as a plurality of cameras are provided at different latitudinal positions, as shown in the above-described embodiments, the time needed for photographing is greatly reduced. Further, by continuously photographing the object under different lighting conditions for silhouette and texture images, the quality of the resultant three-dimensional object models is greatly improved without significantly increasing photographing time.

Further, to put the object on a material, which is at least partially transparent, so that the object looks to be substantially floating in air and to photograph the object from a plurality of angles including an angle below the table as explained in the embodiments, it becomes possible to take silhouette images from the bottom of the object and texture images of the bottom of the object without manually changing the direction or orientation of the object. This also greatly contributes to the creation of the resultant three-dimensional object, which is visible from all orientation without relying on manual user operations or increasing the time needed for those manual user operations.

Further, by changing latitudinal photographing positions, at least a latitudinal photographing position close to the lateral angles, in accordance with a size of the object, it becomes possible to always obtain a high quality three-dimensional object model irrespective of a size of the object without increasing a number of photographs.

As described above, in this specification, although only two embodiments have been disclosed, it is possible to replace some of particular elements with alternative elements and remain within the scope of the present invention. A couple of such alternative elements are disclosed as follows.

In the above-described embodiments, an element on which an object to be modeled locates is composed of a glass table or fine transparent fibers secured on the plate. A method or elements for making the object shown in all orientation shall not be limited into the glass table or fine transparent fibers. For example, it is possible to replace these with a transparent fiber hanging the object, a transparent needle-shaped resin piercing the object, or a transparent stool on which the object is set.

Further, in the above-described embodiments, a plurality of digital cameras are prepared and set at different positions for photographing the object from a plurality of different orientations. This structure may be replaced with a structure, which guides and moves one digital camera so that the digital camera, revolving it around the object. If such a structure utilising a single camera is adopted, the camera is moved to locate it at one or more positions for every angle at which the object is rotated and photographs taken from each position.

Further, in the above-described embodiments, although photographs under different lighting conditions are taken for silhouette and texture images, it is not essential to separately photograph the silhouette and texture images. Namely, the present invention can be applied to an apparatus, a method and device, photographing once for both silhouette and texture images wherein the silhouette images are obtained by removing the background by using the choroma-key technique. Even applying such apparatus, method and device, as it can be seen, the advantage of the present invention of reducing the number of photographs and time similarly exists. Therefore it shall be understood that an apparatus, a method and a device adopting such a structure is with a scope of the present invention.

Further, in the above-described embodiments, longitudinal relative positions, namely rotating positions of the table, are commonly used for several latitudinal positions of a camera and photographs for silhouette and texture images. However, these conditions are not essential for the present invention and, for example, all longitudinal positions can be different for each photographing at different latitudinal positions and can be different between silhouette and texture images.

Furthermore, in the above-described embodiments, automatic photographing is carried out by rotating a table and setting it at a plurality of predetermined angles and it is described as a fully automatic photographing apparatus. However, even it the table is manually or part-manually rotated, it is accomplished that the number of photographs is reduced. Therefore, such a structure that the table is manually rotated is also adopted in the scope of the present invention.

As described above, according to one aspect of the present invention, it becomes possible to minimize a number of photographs and to reduce time for photographing without deteriorating the quality of the resultant three-dimensional object model, by differentiating a number of photographs taken from different relative longitudinal positions between the object and the photographing position, especially by making a larger number of photographs from a relative latitudinal position closer to a lateral position than other relative latitudinal positions.

Further, according to another aspect of the present invention, it becomes possible to reduce necessary time for relatively changing positions of the object and the photographing position by taking a plurality of photographs at a plurality of different relative latitudinal positions while keeping a relative longitudinal position between the object and the photographing position. Accordingly the total time needed for photographing the necessary images for creating a three-dimensional object model is shorter. Especially, by taking a plurality of photographs for creating both silhouette and texture images under different lighting conditions while keeping the relative longitudinal position between the object and the photographing position, total photographing time is further reduced.

Further, it becomes possible to obtain a high quality three-dimensional object model irrespective of a size of the object without increasing the number of photographs, by selecting a relative latitudinal position between the object and the photographing position in accordance with the size of the object.

The invention claimed is:

1. An apparatus for creating a three-dimensional object model, comprising:
    photographing means for photographing an object to be modeled for obtaining images to be used for creating the three-dimensional object model;
    setting means for longitudinally and latitudinally setting a relative position between the object and said photographing means, said setting means being capable of setting the object and said photographing means a plurality of different relative longitudinal and latitudinal positions; and
    control means for controlling said photographing means and said setting means so that a number of photographs taken from different relative longitudinal positions at a first relative latitudinal position is larger than that taken from different relative longitudinal positions at a second relative latitudinal position, with the first relative latitudinal position being closer to a lateral position than the second relative latitudinal position.

2. An apparatus according to claim 1, further comprising lighting means including front lighting means capable of lighting a front side of the object confronting a photographing position of said photographing means and back lighting means capable of lighting a back side of the object hidden from the photographing position of said photographing means, wherein said control means controls said photographing means and said back lighting means so that said back lighting means operates in a first mode when said photographing means photographs for obtaining silhouette images but in a second mode when said photographing means photographs for obtaining texture images.

3. An apparatus according to claim 1, wherein said setting means includes positioning means for positioning the object on the plane as a manner putting the object so as to be shown in any direction.

4. An apparatus according to claim 3, wherein said setting means sets the object and said photographing means at a third relative latitudinal position where said photographing means locates below the object and said control means controls said photographing means and said setting means so that a number of photographs taken from different relative longitudinal positions at the first relative latitudinal position is larger than that taken from different relative longitudinal positions at the third relative latitudinal position.

5. An apparatus according to claim 1, wherein said setting means is capable of selecting the first relative latitudinal position in accordance with a size of the object.

6. An apparatus according to claim 1, wherein said setting means includes positioning means for positioning the object on a horizontal plane where the object is set and rotating means for rotating the horizontal plane.

7. An apparatus according to claim 6, wherein said control means further controls said rotating means so as to set the object and said photographing means at a plurality of different longitudinal orientations.

8. An apparatus according to claim 7, wherein said control means controls said rotating means and said photographing means so that said photographing means continuously photographs the object at the first relative latitudinal position and the second relative latitudinal position while said rotating means set the object at one of the longitudinal orientations.

9. A method for creating a three-dimensional object model, comprising steps of:
    photographing an object to be modeled for obtaining images to be used for creating the three-dimensional object model, longitudinally and latitudinally setting a relative position between the object and a photographing position at a plurality of different relative longitudinal and latitudinal positions; and controlling so that a number of photographs photographed from different relative longitudinal positions at a first relative latitudinal position is larger than that photographed from different relative longitudinal positions at a second relative latitudinal position, with the first relative latitudinal position being closer to a lateral position than the second relative latitudinal position.

10. A method according to claim 9, further comprising a step of changing a lighting condition between a first mode in which the object is photographed for obtaining silhouette images and a second mode in which the object is photographed for obtaining texture images.

11. A method according to claim 9, wherein the object is positioned on a plane so as to be shown in any direction, the object and the photographing position are set at a third relative latitudinal position where the photographing position locates below the object, and a number of photographs photographed from different relative longitudinal positions at the first relative latitudinal position is larger than that photographed from different relative longitudinal positions at the third relative latitudinal position.

12. A device for creating a three-dimensional object model, comprising:

one or more cameras for photographing an object to be modeled for obtaining images to be used for creating the three-dimensional object model;

a position changer for longitudinally and latitudinally changing a relative position between the object and the camera to be used for photographing, the position changer being capable of setting the camera and the object at a plurality of different relative longitudinal and latitudinal positions; and a controller for controlling the camera and the position changer so that a number of photographs taken from different relative longitudinal positions at a first relative latitudinal position is larger than that taken from different relative longitudinal positions at a second relative latitudinal position, the first relative latitudinal position being closer to a lateral position than the second relative latitudinal position.

13. A device according to claim 12, further comprising a front light capable of lighting a front side of the object confronting the camera and a back light capable of lighting a back side of the object hidden from the camera, wherein the controller controls the camera and the back light so that the back light operates in a first mode when the camera photographs for obtaining silhouette images but in a second mode when the camera photographs for obtaining texture images.

14. A device according to claim 12, wherein the object is set on a horizontal plane as a manner putting the object so as to be shown in any direction.

15. A device according to claim 14, wherein the position changer sets the object and the camera at a third relative latitudinal position where the camera locates below the object and the controller controls the camera and the position changer so that a number of photographs taken from different relative longitudinal positions at the first relative latitudinal position is larger than that taken from different relative longitudinal positions at the third relative latitudinal position.

* * * * *